Figure 1:
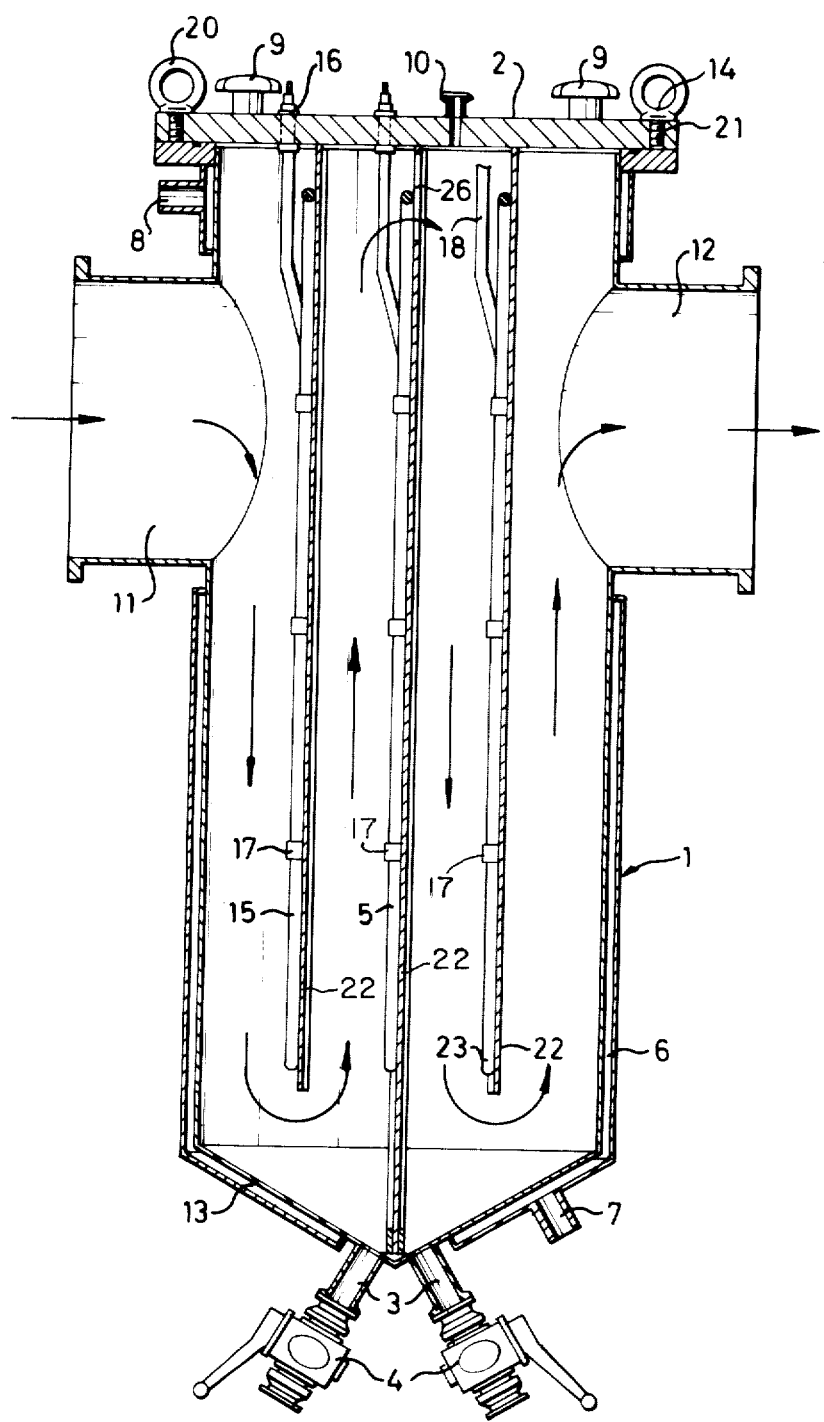

United States Patent [19]

Riis

[11] 3,892,550

[45] July 1, 1975

[54] APPARATUS FOR SEPARATING CONDENSATION OF WAX FROM GAS

[75] Inventor: Sören Riis, Fagersta, Sweden

[73] Assignee: Seco Tools AB, Fagersta, Sweden

[22] Filed: June 19, 1974

[21] Appl. No.: 480,937

[30] Foreign Application Priority Data
July 6, 1973  Sweden ............................ 73095762

[52] U.S. Cl. ...................... 55/269; 55/446; 55/466; 266/15
[51] Int. Cl.² ......................................... B01D 45/08
[58] Field of Search ............ 55/445, 446, 269, 466; 165/111–114; 266/15

[56] References Cited
UNITED STATES PATENTS

| | | | |
|---|---|---|---|
| 1,604,179 | 8/1950 | Leach | 165/113 |
| 2,519,920 | 8/1950 | Miner | 159/DIG. 1 |

FOREIGN PATENTS OR APPLICATIONS

| | | | |
|---|---|---|---|
| 311,204 | 5/1929 | United Kingdom | 55/269 |

*Primary Examiner*—Bernard Nozick
*Attorney, Agent, or Firm*—Larson, Taylor and Hinds

[57] ABSTRACT

An apparatus for condensing and separating wax, paraffin etc. from a gas flow, especially in connection with a vacuum dewaxing furnace for powder metallurgical production. The apparatus is located between the furnace and a vacuum pump and comprises a container having inlet and outlet openings for the gas flow and a baffle defining a tortious path between the inlet and the outlet to separate the wax from the gas. Heater elements are mounted inside the container for heating the gas to a temperature above the boiling point of the wax. The inner walls of the container are heated to a temperature above the fusing point of the wax but below its boiling point for condensing the wax and draining it off.

10 Claims, 2 Drawing Figures

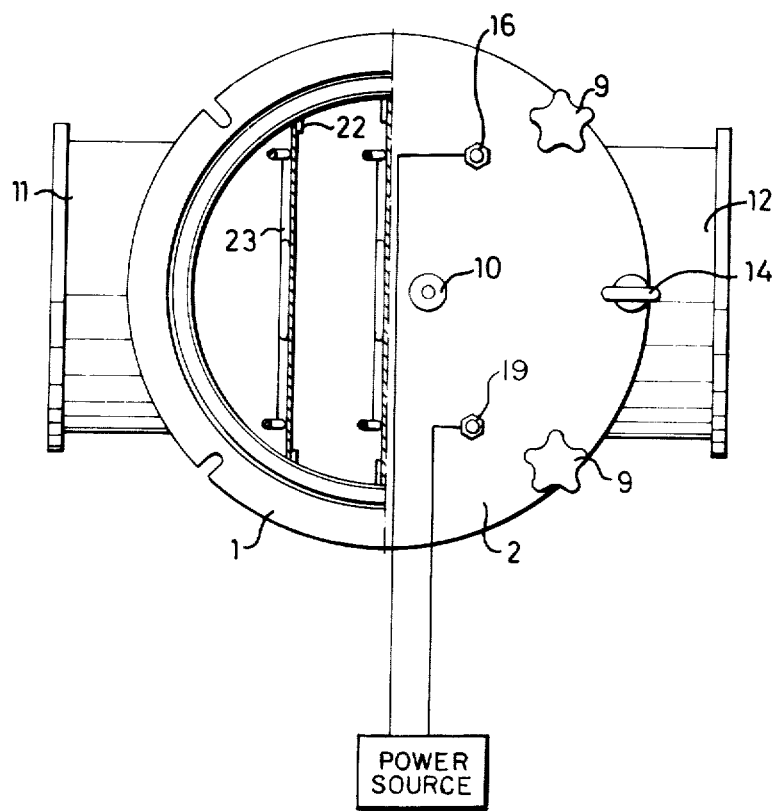

APPARATUS FOR SEPARATING CONDENSATION OF WAX FROM GAS

The present invention refers to an apparatus for condensation and separation of wax from a gas flow, particularly in connection with a vacuum dewaxing furnace for powder metallurgical production said apparatus being placed between furnace and vacuum pump and comprising a container having inlet and outlet openings for the gas flow.

In powder metallurgical production, e.g. production of cemented carbide, wax is added to the powder in order to attain a continuous and manageable body when moulding. It is usually desirable that the wax is cupelled before the final sintering wherein said cupellation occurs at a raised temperature and reduced pressure and often as a first work cycle in vacuum sintering furnace. The wax then escapes as vapor and should thereafter be condensed and recovered as it otherwise gets deposited in the vacuum pump and causes breakdowns in the same. A certain part of the wax is condensed at the walls of the furnace and causes thereby no problems and is recovered in some suitable way. That wax which gives rise to problems is that which leaves the furnace in the vacuum line to the pump and the object of the present invention is to solve the problems in connection with the recovery of said wax before it arrives at the pump.

Known equipment for recovery of the wax which leaves the furnace comprises a condenser in which the gas is cooled down so that the wax is transformed into solid state. The wax is then condensed almost immediately after it has left the furnace and is transformed into the solid state. The wax passes through the condensor as small, solid particles which are deposited in the filter which is arranged in front of the pump. This implies that the filter must be changed or cleaned continuously, often after each running with the furnace and at least after one to five runnings which causes troublesome breakdowns.

The present invention is characterized in that the apparatus comprises elements inside said container so that the gas flow is heated to a temperature above the boiling point of the wax and that moreover means are arranged for heating the inner walls of the container to a temperature above the melting point of the wax.

The invention will be described in detail in the following specification with reference to the accompanying drawing in which an embodiment of the invention is diagrammatically illustrated as an example.

FIG. 1 illustrates an axial section through an apparatus according to the invention and FIG. 2 is a plan view of the apparatus according to FIG. 1, the upper part of the apparatus being partly cut away.

The apparatus shown on the drawing consists of a cylindrical container 1 having a downward conical bottom part 13 and a cover 2. Container 1 is connected to a sintering furnace (not shown) by means of its inlet opening 11 and to a vacuum pump (not shown) by means of its outlet opening 12. Between outlet opening 12 and the vacuum pump there is usually a filter insert (not shown). Cover 2 is tightened to the container by means of knobs 9. On the underside of cover 2 there are suspended three heating elements 5, 15 and 25, preferably electrical elements. Element tubes 23 are fastened by means of fasteners 17 each to an inner wall or baffle 22 which may be for example a steel plate, the middle one of which is drawn down to the bottom of the container and has an opening 26 at the upper part of the same. The element tubes have a curved part 18 at the one ends of the same which terminates in a coupling nipple 16. The opposite ends of the element tubes have similar coupling nipples 19 (see FIG. 2). Cover 2 can be lifted up from container 1 by means of eye bolts 14 and 20 having screw threads 21. The conical bottom part 13 of container 1 is provided with two outlets 3 for molten wax which are each adjustable by means of a tap 4. The wall of the container is built up from two layers so that between the layers is formed a water jacket 6 inside which water can circulate from an inlet 7 to an outlet 8 in the lower and upper parts of the jacket respectively. Cover 2 has moreover a vacuum tight bushing 10 intended for e.g. a thermocouple for measurement of temperature.

In the apparatus according to the invention wax is condensed before it arrives at the vacuum pump or the filter in front of the same and is collected in liquid state through the outlets 3. The gas flow coming in from the furnace through the inlet opening 11 passes down past element 15 and between the lower part of the same and bottom part 13 and then upwards past element 5 and through opening 26, and then downwards past element 23 and between the lower part of the same and bottom part 13 and eventually upwards and out of container 1 through outlet opening 12. During said passage through container 1 the gas flow from the furnace is first heated so much within the container that all of the wax will be again vaporized. This is done by means of the heating elements 5, 15 and 23. The temperature of the heating elements is maintained at about 300°C which is above the boiling point of the various constituents of the wax at the existing pressure. During the running of the process the pressure in the container is maintained usually at a value less than 100 Pa. The temperature of the walls of the container is controlled e.g. by hot water which is fed via inlet 7 and fed out via outlet 8 and which has a temperature of about 80°-90°C or well above the melting point of the wax, which is 50–70°C for these kinds of wax.

The gas leaving the furnace during the evacuation consists to a major part of wax which is condensed to small liquid drops but even solid and gaseous particles can be present depending upon the contents of more or less volatile constituents of the wax. The walls of container 1 are maintained at such a temperature that the wax is deposited on them, is maintained in liquid state and can run down to the conical bottom part 13 of the chamber or container. The wax is thereafter held in liquid state or is allowed to solidify in the container. The wax can then be drained off through outlets 3 and taps 4, and if the wax has solidified it is made liquid by heating the walls of the container by means of circulation of hot water inside jacket 6 in the manner described above.

By means of an apparatus according to the present invention a 10 times higher separation degree has been attained compared with existing equipment. It has been established that it is possible to carry out 15–20 runnings of the furnace between filter exchange or filter cleaning compared with only one to five runnings according to prior art.

The invention is not limited to the particular embodiment as described above but comprises all those embodiments which fall within the frame of the appendent patent claims.

I claim:

1. An apparatus for condensation and separation of wax, paraffin etc. from a gas flow, in connection with a vacuum dewaxing furnace for powder metallurgical production, said apparatus being placed between furnace and vacuum pump and comprising a container having inlet and outlet openings for the gas flow and baffle means defining a tortious path therebetween to separate the wax from the gas, characterized by means for vaporizing the wax comprising heater elements mounted inside the container for heating the gas flow from the furnace to a temperature above the boiling point of the wax, means for condensing the wax comprising means for heating the inner walls of the container to a temperature above the fusing point of the wax but below the boiling point of the same and means for draining off the wax thus condensed.

2. An apparatus according to claim 1, characterized in that the elements for heating the gas flow are electrical heating elements having a temperature between 200° and 500°C.

3. An apparatus according to claim 1, characterized in that the inlet and outlet openings for the gas flow are coaxial horizontally.

4. An apparatus according to claim 1, characterized in that the means for heating the inner walls of the container consist of a hot water jacket constituted by double container walls.

5. An apparatus according to claim 3, characterized in that the water jacket has a lower inlet for hot water having a temperature between 60° and 90°C.

6. An apparatus according to claim 1, characterized in that the bottom part of the container comprises said means for draining off condensed wax.

7. An apparatus according to claim 4, characterized in that the bottom part of the container is shaped downwardly conical.

8. An apparatus according to claim 1, said baffle means comprising a plurality of vertically extending baffles defining said tortious path for the gas flow, said heating elements mounted on the baffles.

9. An apparatus according to claim 8, said container comprising an upper cover, said heating elements being electrical heating elements having ends passing through the cover for connection to an electrical power source.

10. An apparatus according to claim 8, said container comprising a central baffle with an upper opening, and lateral baffles on each side of the central baffle with lower openings, said baffles defining with the inlet and outlet openings the said tortious path beneath the lateral baffle closest to the inlet, up along said central baffle and through said upper opening, and downwardly along said central baffle and beneath the other lateral baffle and through the outlet, the bottom of the container being conical, and including drain openings at the bottom of the container on each side of the central baffle.

* * * * *